United States Patent
Roufs et al.

[19]

[11] Patent Number: 6,036,115
[45] Date of Patent: Mar. 14, 2000

[54] STEAM ASSISTED SUGAR COATING DISCHARGE NOZZLE

[75] Inventors: John G. Roufs, Maple Grove; Gary C. Veenhuis, Albertville, both of Minn.

[73] Assignee: General Mills, Inc., Minneapolis, Minn.

[21] Appl. No.: 08/687,765

[22] Filed: Jul. 26, 1996

Related U.S. Application Data

[60] Continuation of application No. 08/422,239, Apr. 14, 1995, abandoned, which is a division of application No. 08/259,709, Jun. 14, 1994, Pat. No. 5,453,383.

[51] Int. Cl.[7] .................................................. B05B 7/06
[52] U.S. Cl. .................. 239/424.5; 239/429; 239/424
[58] Field of Search ................. 239/424.5, 424, 239/423, 418, 434.5, 433, 429; 118/19, 24, 13, 308, 417; 99/494, 516, 323.8

[56] References Cited

U.S. PATENT DOCUMENTS

| | | |
|---|---|---|
| 1,374,938 | 4/1921 | McNulty, Jr. . |
| 2,335,116 | 11/1943 | Hensen ..................... 239/415 |
| 2,513,081 | 6/1950 | Clark et al. ............... 239/307 |
| 2,726,959 | 12/1955 | Lushbough et al. ........ 476/307 X |
| 2,915,024 | 12/1959 | Krüger et al. ............. 118/24 X |
| 2,991,015 | 7/1961 | Standlick ................... 239/127 |
| 3,157,361 | 11/1964 | Heard ......................... 239/427 |
| 3,199,790 | 8/1965 | Giesemann ................. 239/428 |
| 3,470,831 | 10/1969 | Von Drachenfels .......... 118/24 X |
| 3,557,717 | 1/1971 | Chivers ..................... 426/474 X |
| 3,587,974 | 6/1971 | Rosenkratz ................. 239/433 X |
| 3,615,676 | 10/1971 | McKown et al. . |
| 3,623,669 | 11/1971 | Woods ....................... 239/307 |
| 3,677,808 | 7/1972 | Sheridan . |
| 3,976,793 | 8/1976 | Olson et al. ............... 476/302 X |
| 4,032,667 | 6/1977 | Kreuter ...................... 118/24 X |
| 4,079,151 | 3/1978 | Schade et al. ............. 426/302 X |
| 4,093,188 | 6/1978 | Horner ....................... 366/336 |
| 4,169,545 | 10/1979 | Decker ...................... 222/136 |
| 4,262,847 | 4/1981 | Stitzer et al. .............. 239/112 |
| 4,283,012 | 8/1981 | Hanson ...................... 239/424 X |

(List continued on next page.)

FOREIGN PATENT DOCUMENTS

| | | |
|---|---|---|
| 0 192 865 | 9/1986 | European Pat. Off. . |
| 0 237 352 | 9/1987 | European Pat. Off. . |
| 985544 | 7/1951 | France . |
| 608 343 | 1/1979 | Switzerland . |
| 863007 | 9/1981 | U.S.S.R. ................... 239/419.3 |
| 1503682 | 5/1975 | United Kingdom ............ 118/24 |

OTHER PUBLICATIONS

"Breakfast Cereals and How They are Made," ed. by R. B. Fast and E. F. Caldwell, 1990, pp. 195–220.
Article, Popular Mechanics, May 1993, p. 57, "Airless Sprayer".

*Primary Examiner*—Lesley D. Morris
*Attorney, Agent, or Firm*—John A. O'Toole; Douglas J. Taylor; Alan D. Kamrath

[57] ABSTRACT

An improved sugar slurry spray discharge nozzle (10) is shown for co-spraying steam into the sugar slurry spray. The nozzle (10) finds particular suitability for use in the applying of a sugar coating solution or slurry to a Ready-To-Eat breakfast cereal base in an enrober. By virtue of providing a steam assist to the spraying of the sticky sugar coating solution, desirable reductions in downtime for cleaning of the enrober are achieved. The improved nozzle includes a cylindrical steam chamber (14), an axially extending slurry supply tube (22) disposed therein having a discharge port (25) and orifice for discharging steam into the slurry discharge such as opposed pair of arcuate steam discharge slits (66, 68) proximate the slurry tube discharge port (25). The steam discharge atomizes the slurry discharge spray and provides heat energy to the spray with the result that the slurry is applied to the cereal base with reduced sugar build-up on the enrober.

14 Claims, 5 Drawing Sheets

U.S. PATENT DOCUMENTS

| | | | |
|---|---|---|---|
| 4,293,570 | 10/1981 | Vadasz | 426/103 X |
| 4,294,868 | 10/1981 | Kalbskopf et al. . | |
| 4,422,574 | 12/1983 | Mancuso, Jr. | 239/424 X |
| 4,614,490 | 9/1986 | Kiczek et al. . | |
| 4,617,872 | 10/1986 | Melliger | 118/19 |
| 4,619,843 | 10/1986 | Mutsors | 239/424 X |
| 4,645,127 | 2/1987 | Emory et al. | 239/424.5 X |
| 4,658,754 | 4/1987 | Messner et al. | 239/424 X |
| 4,668,180 | 5/1987 | Newman | 239/424 X |
| 4,676,437 | 6/1987 | Brown | 239/414 |
| 4,755,390 | 7/1988 | Calandro et al. . | |
| 4,760,956 | 8/1988 | Mansfield | 239/8 |
| 4,840,493 | 6/1989 | Horner | 366/339 |
| 4,850,705 | 7/1989 | Horner | 366/339 |
| 4,909,420 | 3/1990 | Reyner | 222/386.5 |
| 4,925,107 | 5/1990 | Brown | 239/414 |
| 4,934,445 | 6/1990 | Plata et al. . | |
| 5,005,514 | 4/1991 | Verrico . | |
| 5,012,975 | 5/1991 | Korsmeyer | 239/9 |
| 5,069,118 | 12/1991 | Bergquist et al. | 99/516 X |
| 5,219,097 | 6/1993 | Huber et al. | 222/145 |
| 5,302,201 | 4/1994 | Lücke | 118/19 |
| 5,370,734 | 12/1994 | Ferrero | 118/24 X |
| 5,403,395 | 4/1995 | McCullough et al. . | |

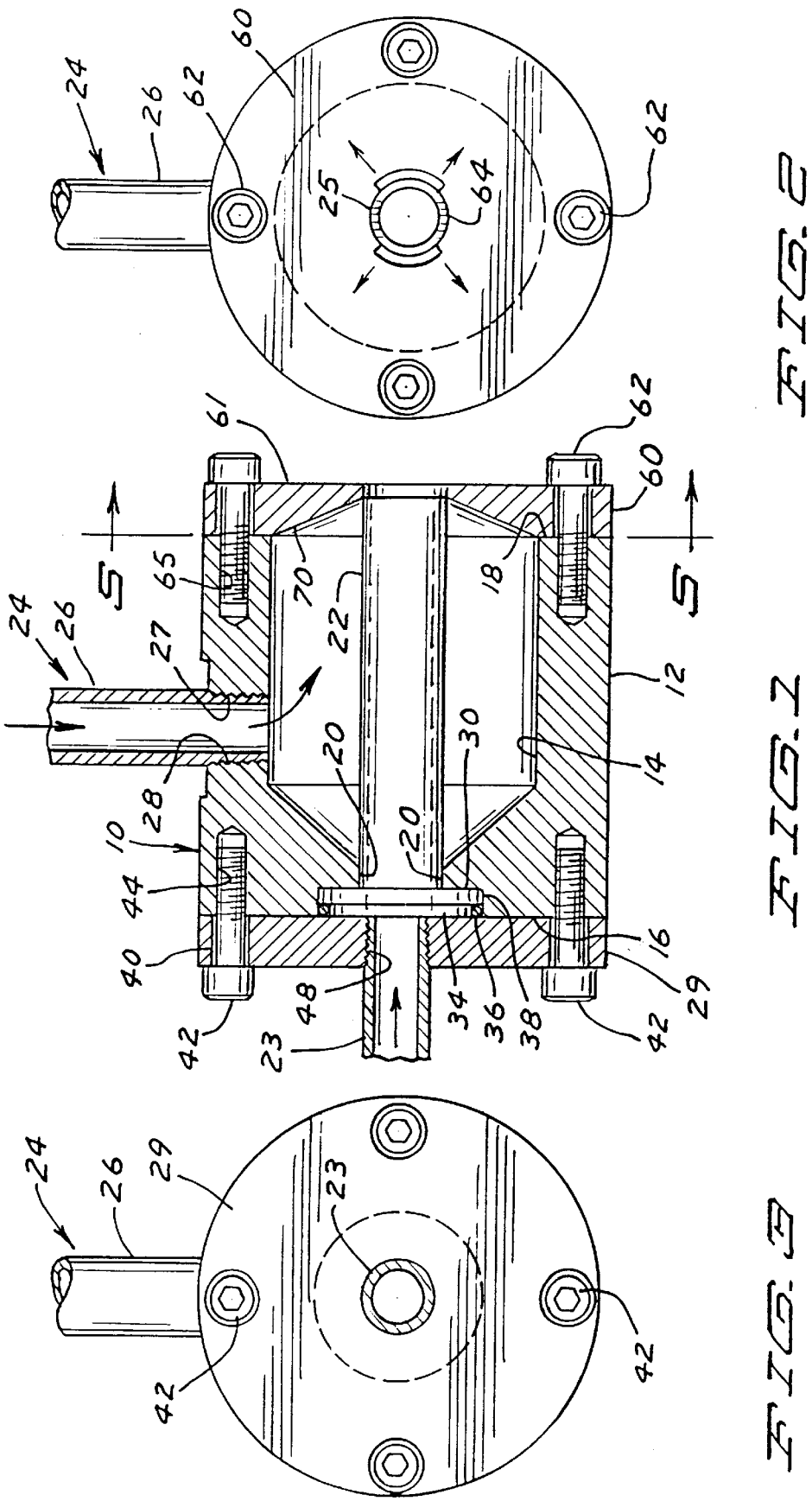

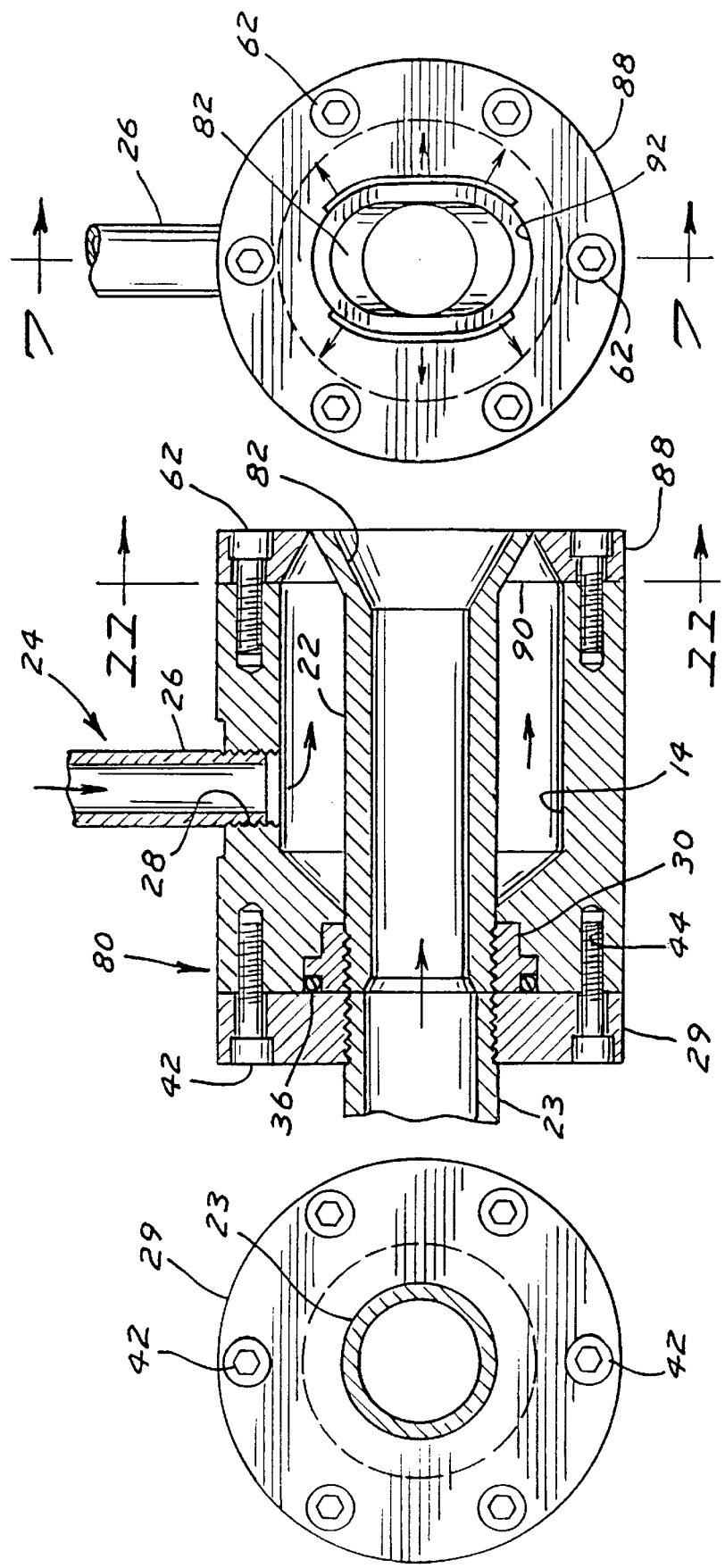

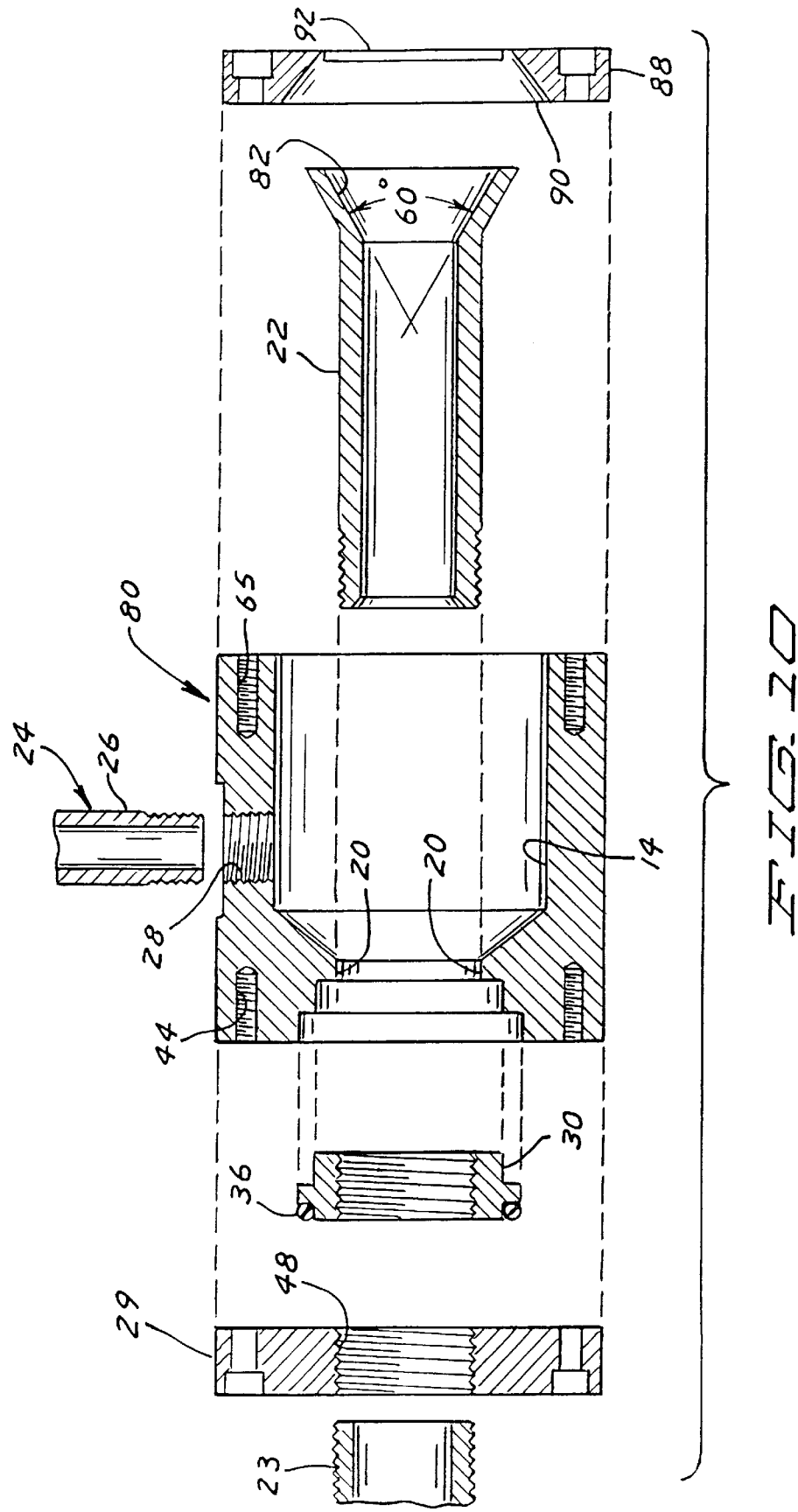

STEAM ASSISTED SUGAR COATING DISCHARGE NOZZLE

This application is a continuation of application Ser. No. 08/422,239 filed on Apr. 14, 1995, now abandoned which is a division of application Ser. No. 08/259,709, filed Jun. 14, 1994 now U.S. Pat. No. 5,453,383.

FIELD OF THE INVENTION

The present invention is directed to a food processing apparatus. More particularly, the present invention is directed to an improved restrictive orifice nozzle for applying a sugar coating solution to a Ready-To-Eat breakfast cereal base using a steam co-discharge.

BACKGROUND OF THE INVENTION

A wide variety of operations, especially food processing, involve the application of a fluid coating material. In particular, the preparation of certain presweetened Ready-To-Eat ("R-T-E") breakfast cereals involves the application of a sticky sugar coating solution or slurry to a prepared R-T-E cereal base. The wet, sugar coated R-T-E cereal is subsequently dried and packaged to form the finished product.

Conventionally, the sugar coating solution or slurry is applied to the R-T-E cereal base with conventional spray nozzles that dispense the slurry in a spray pattern using only the hydrostatic pressure of the slurry supply to form the spray. The nozzles are typically mounted within an R-T-E cereal base enrober. A good description of such coating apparatus and techniques is given in "Breakfast Cereals and How They Are Made" (edited by R. B. Fast and E. F. Caldwell), American Association of Cereal Chemists, Inc., 1990, pg. 200–220. Such an enrober is an apparatus having a rotating horizontally extending vessel or drum, generally cylindrically shaped, although the axis may be at a slight angle relative to the horizontal, frequently having a lower discharge end. The cereal base is fed at one end and is discharged at the opposite end. As the vessel rotates and as the slurry is dispensed within the enrober, the slurry is evenly applied, more or less, as the cereal is tumbled within and travels along the axis of the enrober. While useful and effective, the ease of conventional hydrostatic slurry restrictive orifice discharge nozzles has numerous disadvantages.

One disadvantage involves the gradual build-up of the slurry upon the interior of the enrober vessel. After this build-up of sugar, the enrober must be thoroughly cleaned. Depending upon a variety of factors, the cleaning operation must be conducted at least once per day and perhaps as frequently as once per operating shift. Cleaning the enrober is thus a standard element of operating hygiene that usually takes up to an hour to perform. Thus, slurry build-up requires the direct cost of maintenance servicing. More importantly, since most cereal processing lines are generally continuous, slurry buildup can cause the more significant cost of downtime of the entire cereal processing line.

Still another problem with the use of conventional restrictive orifice nozzles involves the evenness of the slurry distribution over the cereal base. Of course, an evenly distributed slurry is desired. Using conventional nozzles, improved evenness of distribution can be obtained by greater tumbling (e.g., faster rotation and/or increased residence time in the enrober). However, many R-T-E cereals, especially those in flake form, are fragile. Greater tumbling leads to the development of broken flakes or fines that subsequently must be screened out. Fines generation can lead to yield losses of up to 5% or more of the cereal line's capacity.

Still another problem is undesirable product agglomeration. Undesirable product agglomeration can be aggravated by poor slurry distribution. Undesirable product agglomeration can result in the generation of large, unattractive, hard pieces that should be screened out.

Still another benefit resides in the reduction in the amount of expensive sugar ingredients lost as part of the sugar build-up that must be washed away during enrober cleaning. Still another advantage resides in reduction in undesirable product agglomerates.

Surprisingly, use of a steam assisted slurry nozzle provides dramatic improvements in the sugar solution coating of R-T-E cereals. One benefit is a marked decrease in the amount of sugar build-up upon the enrober's interior surface that allows for reductions in cleaning service requirements and its concomitant losses in production capacity.

Still another advantage resides in reduction in undesirable product agglomerates.

BRIEF DESCRIPTION OF THE DRAWINGS

FIG. 1 is a cross sectional view taken along lines 1—1 of FIG. 2 of a first embodiment of the present steam nozzle.

FIG. 2 is an end view of the steam nozzle showing the discharge end.

FIG. 3 is an opposed end view of the steam nozzle showing the inlet end.

FIG. 7 is a cross sectional view taken along lines 7—7 of FIG. 8 of a second preferred embodiment of the present steam nozzle.

FIG. 8 is an end view of the steam nozzle showing the discharge cap.

FIG. 9 is an opposed end view of the steam nozzle showing the inlet end.

FIG. 10 is a sectional exploded view of the steam nozzle.

DESCRIPTION OF THE PREFERRED EMBODIMENT

Figure 4:
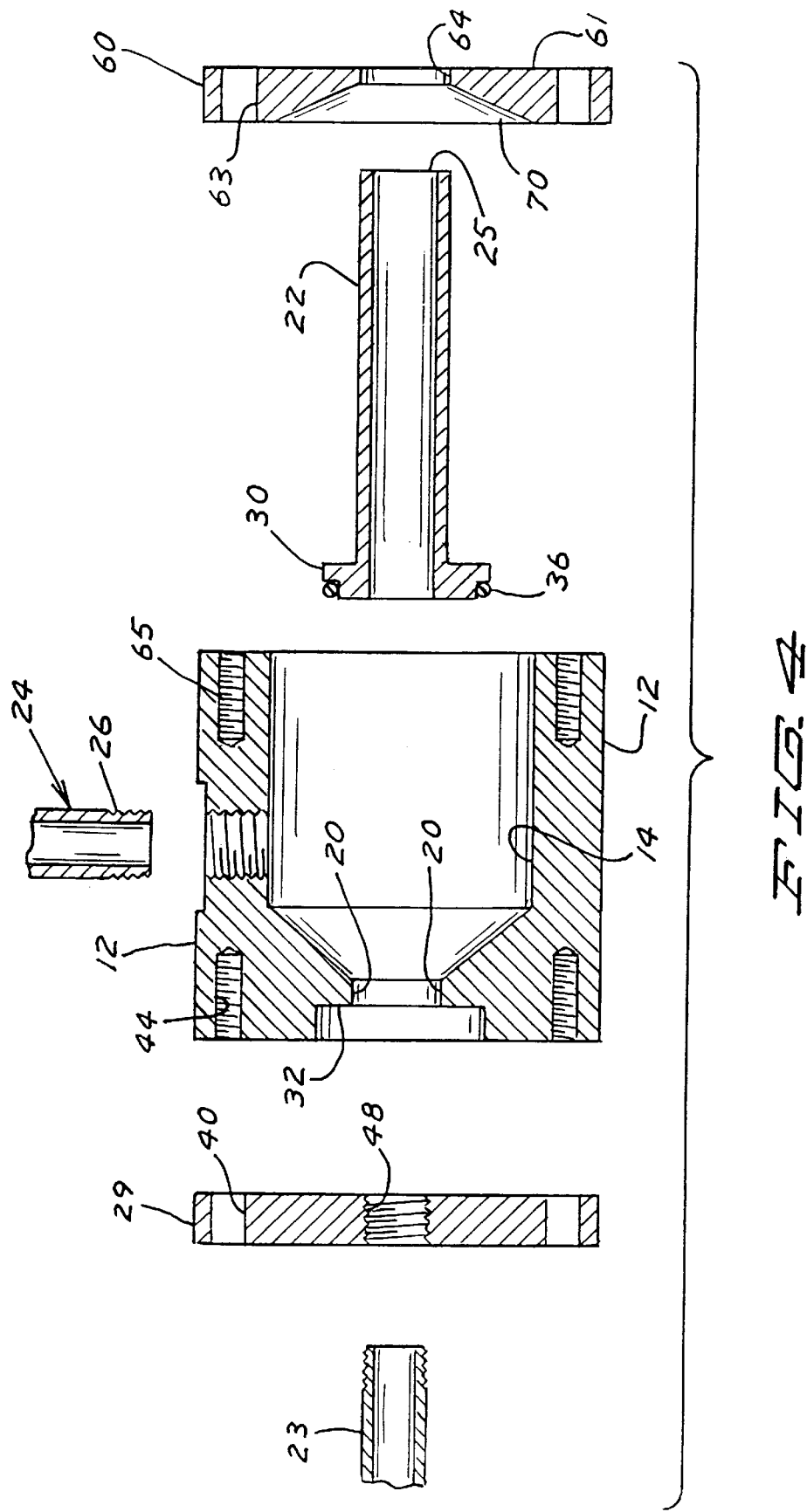
FIG. 4 is a sectional exploded view of the nozzle with the bolts removed.

Referring now to FIG. 1, there is shown a first embodiment of the present steam nozzle generally referred to by reference numeral 10. Thus, generally, the invention resides in and provides improved sugar slurry spray nozzles that additionally include a means for co-spraying a steam spray to intermix with the sugar slurry spray exterior to the nozzle. The nozzle 10 comprises a means for spraying a sugar slurry to form a sugar slurry spray pattern and a means for co-spraying steam into a steam spray pattern into the sugar slurry spray pattern to intermix the sugar slurry spray and steam spray. Specifically, in the preferred embodiment, the nozzle 10 includes a nozzle body 12 that can be of any shape but which is conveniently cylindrical. The nozzle body 12 includes a steam spray means which can comprise an axially extending interior cavity defining a steam chamber or manifold 14, an inlet or receiving end 16 having an inlet end face, and a discharge end 18 having a discharge end face open to the steam chamber 14. The body 12 additionally comprises at least one means for supplying a sugar slurry fluid such as an axially aligned slurry delivery member 22 having a passageway therethrough disposed within an axially aligned bore 20. The nozzle 10 additionally includes a steam supply 24 which can include a steam supply tube 26 screwed into receiving threads 27 of a steam inlet port 28 to provide steam continuously to the steam manifold 14. The slurry delivery member 22 is operatively connected to a sugar coating supply (not shown) that continuously supplies the sugar slurry under modest hydrostatic pressure such as a positive displacement pump.

FIGS. 1 and 3 further show that the nozzle 10 further includes at its receiving end 16 a means for securing the sugar slurry member 22 against lateral movement including a first inlet cap 29 and, a first stop head 30 that abuts against a first matching shoulder 32 formed in the bore 20. As seen in FIG. 1, the nozzle 10 additionally comprises a seal means for sealing the nozzle against premature steam/slurry intermix or loss of steam at the receiving end 16 as well as from slurry leaking into the steam cavity including a second or seal head 34 including a conventional "O" ring 36 seated against a matching second shoulder 38 in the axial bore 20. The inlet cap 29 is secured in place in conventional manner such as by a plurality of screws (e.g., four or six) 42 through bores 40 in the inlet cap 29 which are screwed into threaded screw hole bores 44 in the nozzle body 12. The inlet cap 29 includes its own axial bore 48 having threads for receiving a slurry inlet supply tube 23.

Referring now to FIG. 2, it is seen that the nozzle 10 further includes a second, discharge end means for securing the sugar slurry supply tube against lateral movement and for closing the opening in discharge end 18 to steam chamber 14 such as a discharge cap 60 having an exterior discharge face 61 secured in any conventional manner to the discharge end 18 of the nozzle body 12 such as by a plurality, (e.g., four) screws 62 through bores 63 into receiving threaded bores 65 in the nozzle body 12. Discharge cap 60 includes a central aperture 64 for receiving the slurry delivery member 22. Additionally, the discharge cap 60 further includes at least one steam discharge orifice from the steam chamber 14 positioned proximate the central aperture 64 for the slurry discharge member 22 such as the opposed pair of arcuate or crescent shaped slits 66 and 68.

In preferred embodiments, the steam discharge slits 66 and 68 and the slurry tube discharge end orifice 25 are coplanar, i.e., flat with the plane of the cap's discharge face 61, for improved spray pattern distribution and cleanliness. In other embodiments, either the slits or the discharge orifice 25 are recessed or extended beyond the cap discharge face 61.

The slits in highly preferred embodiments each comprise about 30° to 70°, preferably about 45° of arc spaced equally around aperture 64. While two slits are depicted, other arrangements, e.g., additional slits or holes, can also be employed. The slits are seen to have a width which preferably can range from about 0.25 mm to 1.5 mm and a length of preferably about 5 to 15 mm.

The shape and placement of the slits importantly cause the slurry to be intimately mixed with steam external to the nozzle 10 immediately upon exiting of the nozzle 10 causing, it is believed, the slurry to be atomized into a spray of very fine droplets.

An advantage of this first embodiment is that the angle of dispersion of the slurry spray is low or even close to zero which allows for the spray to be focused in those applications that require careful control or placement of the spray. Also, the steam exit vector is co-axial with the slurry exit vector which avoids excessively turbulent mixing.

Reference now is made briefly to FIG. 4 which shows the above described nozzle components in an exploded view.

Figure 5:
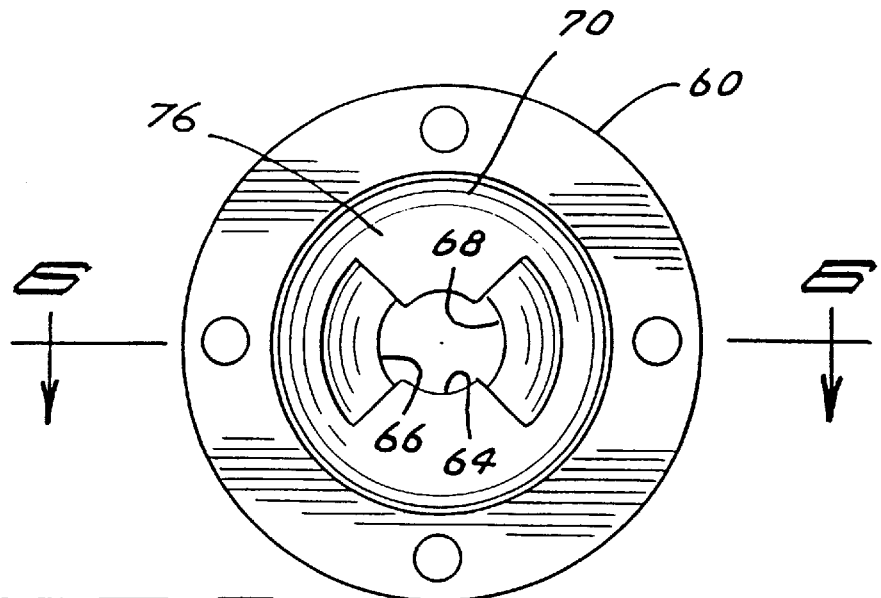
FIG. 5 is a cross sectional view taken along lines 5—5 of FIG. 1 showing the interior surface of the discharge cap.
Figure 6:
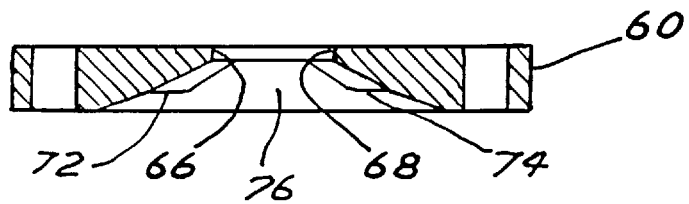
FIG. 6 is a cross sectional view of the end cap taken along lines 6—6 of FIG. 5.

Reference now is made to FIG. 6 which shows the interior surface 70 of discharge cap 60. FIGS. 5 and 6 show that the interior surface 70 is preferably fabricated with shallow fan cuts 72 and 74 proximate each steam slit 66 and 68 for guiding the steam as it exits from the steam reservoir. The fan cuts are deepest as they terminate in the arcuate slit and are progressively shallower as the fan cut extends outwardly from the center. The fan cut(s) assists in the development of an evenly shaped cone pattern to the slurry spray and minimizes condensate build-up. The inner surface 70 of the cap 60 includes a shallow (e.g., 15° to 20°) frusto-conical cut 76 for directing the steam to the arc slits 66 and 68.

In order to change the rate of flow of the steam, a simple valve upstream is opened/closed to regulate steam flow rates.

In the present nozzle design, regulation of the coating solution flow rates can be accomplished simply by substituting one slurry delivery member 22 having a larger or smaller inner diameter as desired. An advantage of the present nozzle design is that such a substitution is easily made by removing the retaining inlet cap and substituting a member 22 having a different, desired size internal diameter ("ID"). The flared nozzle insert is characterized by an inner diameter opening size. The nozzle insert is simply substituted with a nozzle insert having a different, desired size ID. By adjusting the output of the coating solution by using differently sized inserts, the shape of the steam outlet remains the same and thus relatively easy to control.

Reference is now made to FIGS. 7–11 which show a second, preferred embodiment similar in most aspects to the first embodiment and characterized in that the nozzle 80 is provided with a flared slurry delivery member for a wider spray pattern. As can be seen, the basic configuration of nozzle 80 is similar to that described for nozzle 10. However, in this embodiment, FIG. 7 shows that the slurry delivery member includes a flared outlet portion 82. In the more highly preferred embodiment depicted, the flared outlet portion 82 is oval in shape rather than a less preferred circular shape. The oval shape of the flared outlet imparts an oval pattern to the discharge spray while a circular shape imparts a cone spray. An oval spray pattern or cone is preferred to fan spray since fan sprays tend to get a heavier spray load in the ends of the pattern rather than at the middle.

Reference is now made to FIG. 8 which shows that another feature of the oval shape is that the steam discharge arcuate slits begin to curve around the edge of the coating spray. Such a construction importantly minimizes the tendency of the coating spray to form a mist. The relatively larger slits also even out the distribution of the coating spray without causing misting. Misting is a problem to be avoided since the mist tends to travel and drift. Rather than being applied to the surface of the R-T-E cereal as desired, misting causes coating solution loss and undesirable coating solution building on processing equipment.

Figure 11:
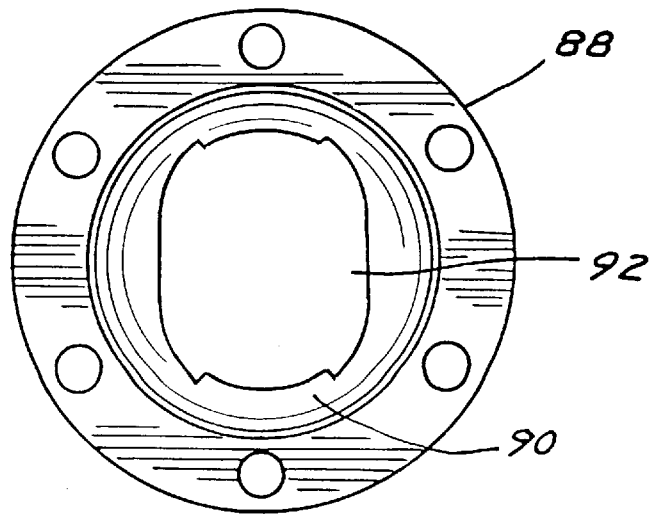
FIG. 11 is a cross sectional view of the end cap taken along lines 11—11 of FIG. 7.

Reference is now made to FIG. 11 which shows the interior surface 90 of discharge cap 88. FIG. 11 shows clearly that the aperture 92 is oval in shape to receive the flared end of the flared slurry discharge tube.

An advantage of the second embodiment having the flared ended supply member is that the angle of dispersion of the slurry spray is quite high (e.g., 120° for the embodiment depicted) leading to a higher extent of dispersion which can be particularly desirable when large amounts of sugar coating are applied to the cereal base.

Conveniently, the second nozzle embodiment can be rapidly adjusted to modify the amount of slurry to be applied by substituting a discharge slurry member having a lower or greater internal diameter as desired similar to that for the first embodiment.

In a minor variation, either embodiment can additionally include a second fluid supply member if more than one coating fluid is desired to be applied. For example, one supply may be for a sugar syrup while a second may supply an edible oil or other fluid.

While the nozzles can be used in a wide variety of coating equipment, in a preferred embodiment, the nozzles are mounted in a rotating cereal enrober in substitution for conventional hydrostatically operated nozzles.

OPERATION OF THE INVENTION

In its method aspect, the present invention broadly resides in co-spraying at least one coating fluid onto a food substrate with steam to form an atomized intermixing spray of coating solution and steam onto a food base. The methods find particular suitability for use in connection with the sugar coating of an R-T-E cereal. While the R-T-E cereal base can comprise a puffed cereal, a shred cereal, a biscuit, and the like, the present method is especially useful for R-T-E cereal base in the form of flakes. In certain preferred embodiments, the present method is practiced employing the present nozzles to provide advantages in terms of ability to adjust and control solution application features such as flow rate and spray pattern through simple and convenient interchange of nozzle pieces.

The sugar slurry can employ conventional sugar coating compositions containing about 80% to 90% sugar(s) and the balance moisture. Some sugar coating compositions optionally additionally include modest levels of an edible oil (e.g., 0.1% to 8%). The sugar slurry can also include colorants, vitamins and other conventional additives. The sugar coating can be supplied at a pressure ranging from about 50 to 150 psig (300 to 900 KPa).

Surprisingly, even low moisture solutions, e.g., 5% to 10% moisture, can also be employed.

If desired, a second or additional coating fluid can also be simultaneously supplied along with the sugar slurry, e.g., a vitamin supply, so as to minimize losses through heating or other handling of expensive and sensitive vitamin ingredients.

While the sugar solution and steam are co-sprayed from a single nozzle, the enrober can be provided with a plurality of such nozzles. For example, a first bank or array of two nozzles can be positioned within the enrober near the inlet end and a second bank of two nozzles can be mounted within the enrober near the discharge end of the enrober. Also, intermediate banks of nozzles can be mounted within the enrober.

The sugar slurry is preferably supplied to the nozzle as a hot solution ranging from 250° to 270° F. (121° to 132° C.), preferably about 255° to 265° F. (124° to 130° C.) so as to maximize dissolution of any sugar crystals which can adversely affect the finished products appearance.

The steam can be either wet, dry or even superheated steam ranging from about 4 to 70 psig (24 to 420 KPa), preferably about 10 to 50 psig (60 to 300 KPa). The amount of steam consumed is not large and a wide variety of steam consumption rates per pound of sugar solution are useful.

The food product piece can be any food substrate typically enrobed or partially coated with a sugar solution.

Especially useful as the food substrate are R-T-E cereals, whether flakes, puffed pieces, biscuits, shreds and mixtures thereof. The amount of sugar slurry applied to the food base can range broadly from about 1 to 150:100, preferably about 50 to 120:100.

In another variation, particulate matter can be added to the enrober for adhering the particulate matter to the external surface of the R-T-E cereal pieces. Particulate matter can include fruit pieces, granola, seed bits, candy bits, bran and mixtures thereof. The particulate material upon finish drying of the R-T-E cereal adheres to the external surface due to the coating action of the sugar slurry.

What is claimed is:

1. A nozzle for spraying a fluid coating such as a sugar slurry having a steam co-spray for improved atomization of the coating, comprising in combination a nozzle body having an internal cavity defining a steam manifold, a steam supply in steam communication with the steam manifold, an inlet face and a discharge face having an opening;

at least one sugar slurry supply member having a passageway therethrough disposed within the nozzle body having an inlet end in fluid communication with a sugar slurry supply and a discharge end;

wherein the sugar slurry member discharge end includes a discharge orifice;

inlet means for securing the sugar slurry supply member against lateral movement, including:

a means for sealing the sugar slurry supply against admixture of the steam and sugar slurry;

discharge means for securing the sugar slurry supply member against lateral movement, said means overlaying and closing the steam chamber discharge opening, said means having a sugar slurry discharge aperture aligned with the sugar slurry tube discharge end passageway, and at least one steam discharge orifice proximate the sugar slurry discharge orifice.

2. The nozzle of claim 1 wherein the discharge means for securing includes at least two steam discharge orifices.

3. The nozzle of claim 2 wherein each said at least two steam discharge orifices are in the shape of an arcuate slit.

4. The nozzle of claim 3 wherein the sugar slurry supply member comprises a tube and wherein the arcuate slits are spaced equally about the periphery of the supply member discharge orifice.

5. The nozzle of claim 4 wherein the sugar slurry supply member discharge end and the steam discharge slits are co-planar.

6. The nozzle of claim 5 wherein the discharge means includes a discharge cap removably secured to the nozzle body.

7. The nozzle of claim 6 wherein the discharge cap has an internal surface having a frusto-conical cut.

8. The nozzle of claim 7 wherein the internal surface includes a pair of shallow fan cuts each terminating proximate each arcuate slit.

9. The nozzle of claim 8 wherein the slits have a width ranging from about 0.25 to 2 mm.

10. The nozzle of claim 4 wherein the sugar slurry supply member (22) includes a flared portion (82) proximate its discharge end.

11. The nozzle of claim 10 wherein the sugar slurry supply member flared portion is oval in cross section and wherein the sugar slurry discharge aperture is oval in cross section.

12. The nozzle of claim 11 wherein the flared portion has an angle of dispersion of about 120°.

13. The nozzle of claim 12 wherein the nozzle is mounted within an enrober.

14. The nozzle of claim 1 wherein a steam exit vector is co-axial with a slurry exit vector to avoid excessive turbulent mixing.

* * * * *